(12) United States Patent
Ogasawara et al.

(10) Patent No.: US 10,883,460 B2
(45) Date of Patent: Jan. 5, 2021

(54) FUEL INJECTION DEVICE

(71) Applicant: DENSO CORPORATION, Kariya (JP)

(72) Inventors: Nao Ogasawara, Kariya (JP); Daiji Ueda, Kariya (JP)

(73) Assignee: DENSO CORPORATION, Kariya (JP)

( * ) Notice: Subject to any disclaimer, the term of this patent is extended or adjusted under 35 U.S.C. 154(b) by 134 days.

(21) Appl. No.: 16/115,854

(22) Filed: Aug. 29, 2018

(65) Prior Publication Data

US 2019/0063385 A1  Feb. 28, 2019

(30) Foreign Application Priority Data

Aug. 31, 2017  (JP) .................................. 2017-166812

(51) Int. Cl.
*F02M 47/02* (2006.01)
*F16K 31/00* (2006.01)
*F02M 63/00* (2006.01)

(52) U.S. Cl.
CPC ......... *F02M 47/027* (2013.01); *F16K 31/004* (2013.01); *F02M 63/0026* (2013.01); *F02M 63/0035* (2013.01); *F02M 63/0077* (2013.01); *F02M 2200/28* (2013.01)

(58) Field of Classification Search
CPC ............. F02M 47/027; F02M 63/0026; F02M 63/0035; F02M 63/0077; F02M 2200/28; F16K 31/004

USPC .......................................................... 239/96
See application file for complete search history.

(56) References Cited

U.S. PATENT DOCUMENTS

| | | | | |
|---|---|---|---|---|
| 7,455,243 | B2 * | 11/2008 | Coldren | F02M 47/027 239/5 |
| 7,469,843 | B2 * | 12/2008 | Ricco | F02M 47/027 123/498 |
| 7,651,039 | B2 * | 1/2010 | Suzuki | F02M 47/027 239/533.2 |
| 9,651,008 | B2 * | 5/2017 | Adachi | F02M 51/06 |
| 2009/0065614 | A1 | 3/2009 | Ganser | |

FOREIGN PATENT DOCUMENTS

JP  2016-053354  4/2016

* cited by examiner

*Primary Examiner* — Christopher S Kim
(74) *Attorney, Agent, or Firm* — Nixon & Vanderhye P.C.

(57) ABSTRACT

A fuel injection device has a valve body, a drive portion, a nozzle needle, and a control valve body. The valve body defines a control chamber, a valve chamber and a low pressure communication passage. The nozzle needle is displaced due to a fuel pressure variation in the control chamber to open/close an injection port. When the control valve body sits on an upper seat surface, a low pressure communication passage is closed so that the valve chamber is fluidly disconnected from the low pressure chamber. The control valve body defines a gap restriction on the upper seat surface. A flow passage area of a sub orifice provided to the low pressure communication passage is smaller than a flow passage area of the gap restriction.

8 Claims, 7 Drawing Sheets

FUEL INJECTION DEVICE

CROSS REFERENCE TO RELATED APPLICATION

This application is based on Japanese Patent Application No. 2017-166812 filed on Aug. 31, 2017, the disclosure of which is incorporated herein by reference.

TECHNICAL FIELD

The present disclosure relates to a fuel injection device that injects fuel from an injection port.

BACKGROUND

A fuel injection device shown in Japanese patent No. 5110321 has a control chamber, a valve chamber, an injection valve member and an actuator valve member. The injection valve member is displaced by a pressure variation in the control chamber, and the actuator valve member is accommodated in the valve chamber. When the actuator valve member sits on a seat surface which is formed on a wall of the valve chamber, the valve chamber is fluidly disconnected from a low-pressure side.

When the valve chamber is fluidly connected to the low-pressure side, a fuel in the control chamber flows out into the low-pressure side through the valve chamber. A fuel pressure in the control chamber is decreased, and the injection valve member is displaced to open an injection orifice, whereby the fuel is injected through the injection orifice.

In the above fuel injection device, the fuel flow rate flowing out from the control chamber into the low-pressure side is limited by a gap restriction which is defined between the actuator valve member and the seat member. When the actuator valve member is misaligned, the condition of the gap restriction is varied, so that the fuel flow rate flowing out from the control chamber into the low-pressure side is also varied. As a result, an opening position of the injection valve member is fluctuated.

SUMMARY

It is an object of the present disclosure to provide a fuel injection device which is able to restrict a variation in opening position of an injection valve member.

According to the present disclosure, a fuel injection device for injecting a fuel from an injection port includes a body defining the injection port, a control chamber filled with the fuel, a valve chamber communicating with the control chamber, and an outflow passage for discharging the fuel in the valve chamber into a low pressure side; a valve member which is displaced by a variation in fuel pressure in the control chamber to open/close the injection port; a control valve body accommodated in the valve chamber in such a manner as to be capable of disconnecting the valve chamber and the low pressure side by sitting on an outflow seat surface formed on a partition wall which defines the valve chamber; and a driving portion driving the control valve body in such a manner that the control valve body sits on the outflow seat surface or moves away from the outflow seat surface.

The control valve body defines a gap restriction on the outflow seat surface when the valve chamber communicates with the low pressure side through the outflow passage. The outflow passage has an outflow orifice which limits a flow rate of the fuel flowing out from the valve chamber into the low pressure side. The outflow orifice has a flow passage area which is smaller than a flow passage area of the gap restriction.

The flow rate of fuel flowing out from the control chamber into the low-pressure side through the valve chamber is limited by the outflow orifice. Thus, even if the control valve body is misaligned, the flow rate of fuel flowing out from the control chamber is hardly varied.

DETAILED DESCRIPTION

Figure 1:
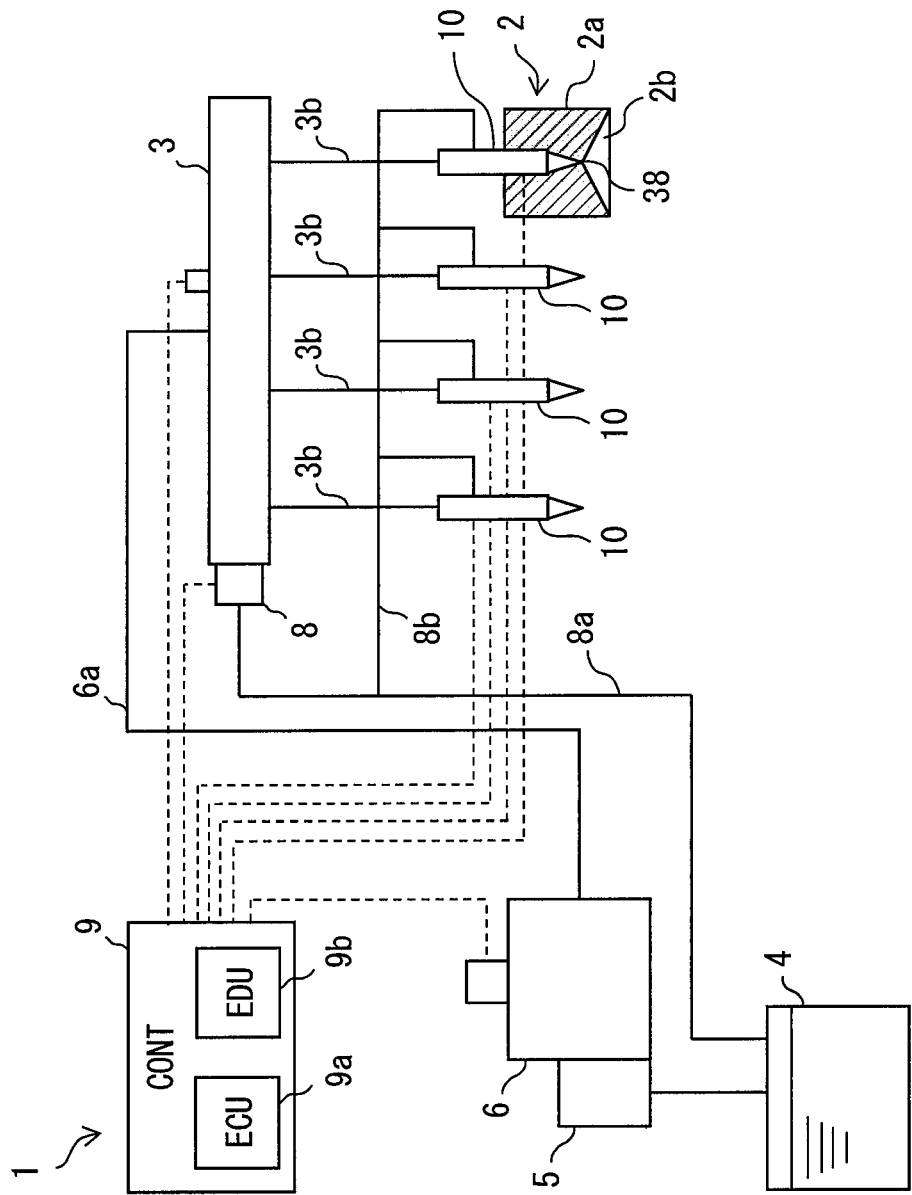
FIG. 1 is a chart showing an overall configuration of a fuel supply system including a fuel injection device and a control device according to a first embodiment.

Hereinafter, embodiments of the present disclosure will be described with reference to the drawings. It is noted that the same reference numerals are attached to the corresponding constituent elements in each embodiment, and redundant explanation may be omitted. In each of the embodiments, when only a part of the configuration is described, the other parts of the configuration can be applied to the other embodiments.

First Embodiment

According to a first embodiment of the present disclosure, a fuel injection device 10 is applied to a fuel supply system 1 shown in FIG. 1. The fuel injection device 10 supplies fuel stored in a fuel tank 4 to each combustion chamber 2b of a diesel engine (hereinafter referred to as "engine 2"). The fuel supply system 1 includes a feed pump 5, a high-pressure fuel pump 6, a common rail 3 and a control device 9.

The feed pump 5 is, for example, a trochoid type electric pump. The high-pressure fuel pump 6 includes the feed pump 5 therein. The feed pump 5 pressure feeds the light oil as the fuel stored in the fuel tank 4 to the high-pressure fuel pump 6. The feed pump 5 may be arranged in the fuel tank 4.

The high-pressure fuel pump 6 is, for example, a plunger type pump. The high-pressure fuel pump 6 is driven by the engine 2. The high-pressure fuel pump 6 is fluidly connected to the common rail 3 through a fuel pipe 6a. The high-pressure fuel pump 6 further pressurizes the fuel supplied from the feed pump 5 and supplies the high-pressure fuel to the common rail 3.

The common rail 3 is fluidly connected to a plurality of fuel injection devices 10 through a high pressure fuel pipe 3b. The common rail 3 is connected to the fuel tank 4 through a return pipe 8a. The common rail 3 temporarily stores high-pressure fuel supplied from the high-pressure fuel pump 6, and distributes the high-pressure fuel to the respective fuel injection devices 10 while maintaining the pressure. The common rail 3 is provided with a pressure reducing valve 8. When the fuel pressure in the common rail 3 is higher than a target pressure, the pressure reducing valve 8 discharges the surplus fuel to the return pipe 8a.

The control device 9 is an electronic control unit including an ECU (Electronic Control Unit) 9a and an EDU (Electronic Driver Unit) 9b. The control device 9 is electrically connected to each fuel injection device 10.

The control device 9 controls fuel injection according to an operation state of the engine 2.

The ECU 9a has an arithmetic circuit configured by a microcomputer or a microcontroller. The arithmetic circuit includes a processor, a RAM, and a rewritable nonvolatile memory device. The EDU 9b applies a drive voltage to a drive portion 40 (see FIG. 2) of the fuel injection device 10 based on a command signal transmitted from the ECU 9a.

The fuel injection device 10 is attached to a head member 2a which defines a combustion chamber 2b. The fuel injection device 10 directly injects the high-pressure fuel into the combustion chamber 2b. The fuel injection device 10 has a valve structure for controlling a fuel injection from the injection port 38. The fuel injection device 10 utilizes a part of high-pressure fuel in order to open/close the injection port 38. A part of the fuel supplied to the fuel injection device 10 is returned to the fuel tank 4 through the return pipe 8a, 8b.

Figure 2:
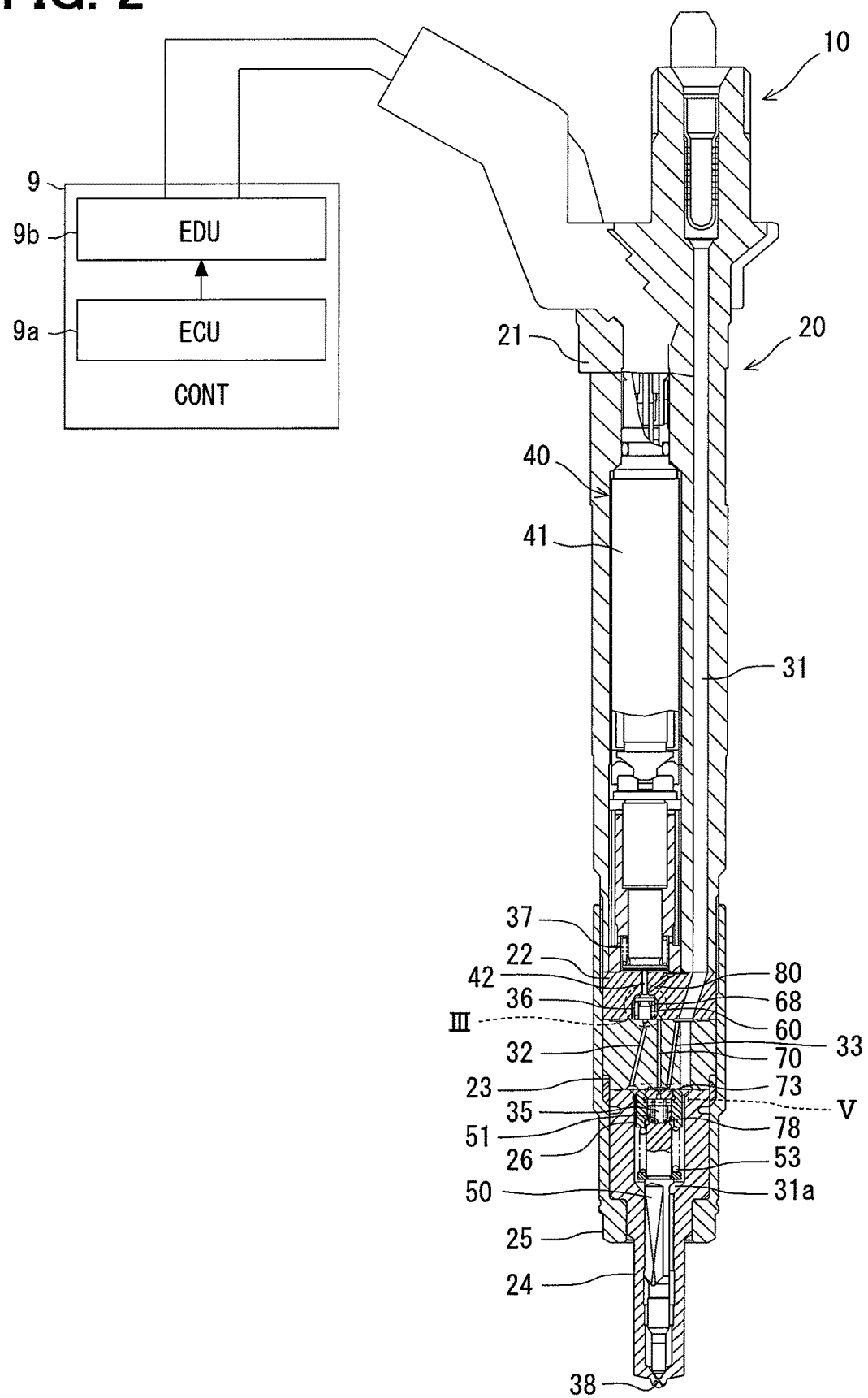
FIG. 2 is a longitudinal sectional view of a fuel injection device.
Figure 3:
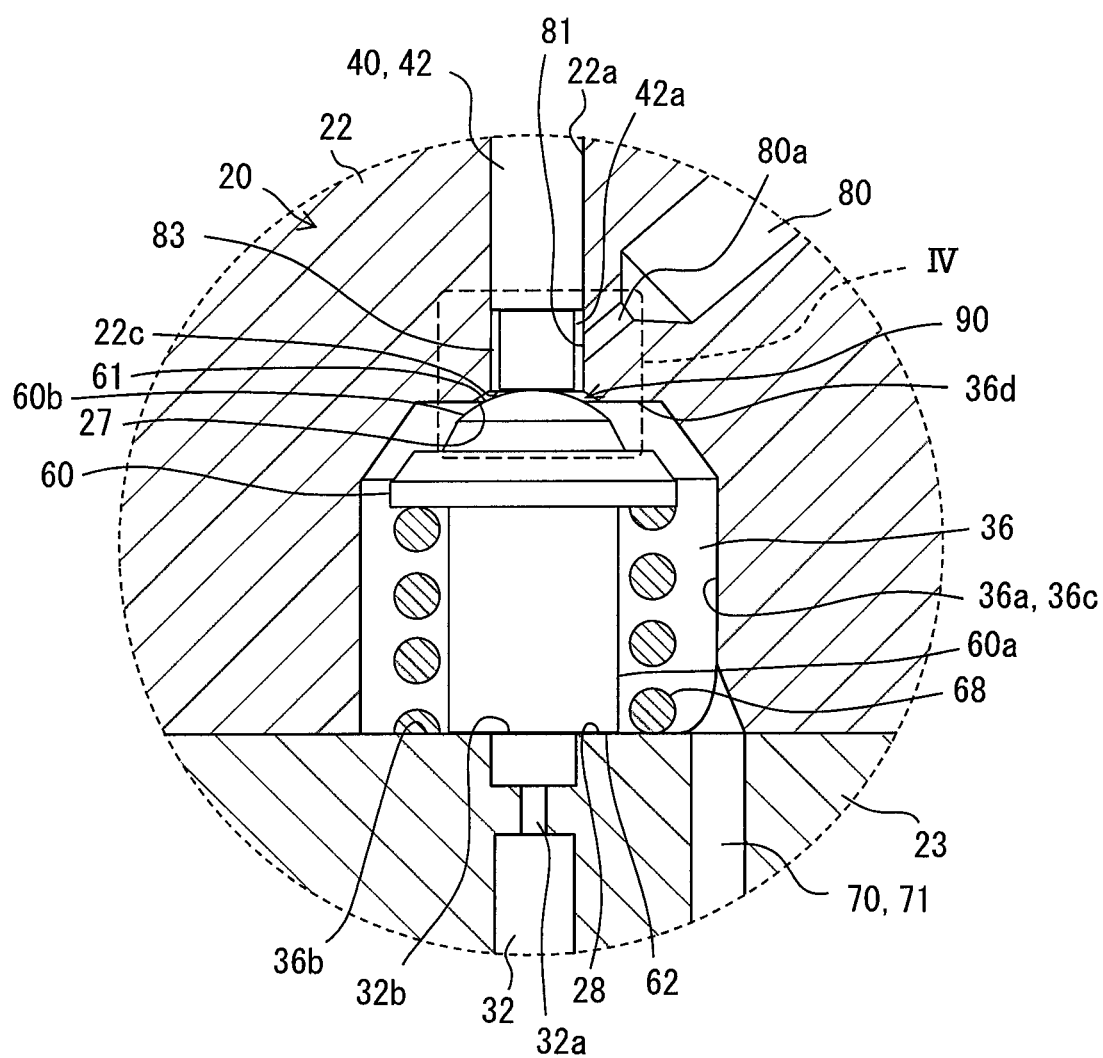
FIG. 3 is an enlarged view of a region III in FIG. 2, showing a vicinity of a valve chamber.

As shown in FIGS. 2 and 3, the fuel injection device 10 includes a valve body 20, a nozzle needle 50, a drive portion 40, a control valve body 60, and a control plate 73.

The valve body 20 includes an injector body member 21, a valve body member 22, an orifice member 23, a nozzle body member 24, a retaining nut 25 and a needle cylinder 26. The valve body 20 has the injection port 38. In addition, the valve body 20 has a high pressure fuel passage 31, a high pressure chamber 31a, a supply communication passage 32, an inflow communication passage 33, a low pressure chamber 37, a control communication passage 70, a low pressure communication passage 80, a control chamber 35 and a valve chamber 36.

The injection port 38 is provided to a tip end of the valve body 20. The injection port 38 is exposed to the combustion chamber 2b. The tip end portion of the valve body 20 is formed in a conical or hemispherical shape. A plurality of injection ports 38 are provided radially from the inside to the outside of the valve body 20. Each injection port 38 injects high-pressure fuel toward the combustion chamber 2b. The high-pressure fuel is atomized by passing through the injection port 38, and is mixed with air.

The high pressure fuel passage 31 is formed over the injector body member 21, the valve body member 22, and the orifice member 23. The high pressure fuel passage 31 is connected to the high pressure fuel pipe 3b. The high pressure fuel passage 31 supplies the high pressure fuel supplied from the common rail 3 to the high pressure chamber 31a through the high pressure fuel pipe 3b.

The high pressure chamber 31a is a columnar space defined in the nozzle body member 24. The nozzle needle 50 and the needle cylinder 26 are housed in the high pressure chamber 31a. The high pressure chamber 31a is connected to the high pressure fuel passage 31. The high pressure chamber 31a is filled with the high pressure fuel supplied through the high pressure fuel passage 31. The high pressure chamber 31a circulates the high pressure fuel to the injection port 38.

The supply communication passage 32 is a fuel passage formed in the orifice member 23. The supply communication passage 32 communicates the high pressure chamber 31a with the valve chamber 36. A sub orifice 32a is formed in the supply communication passage 32. The sub orifice 32a limits the flow rate of fuel flowing from the high pressure chamber 31a into the valve chamber 36.

Figure 5:
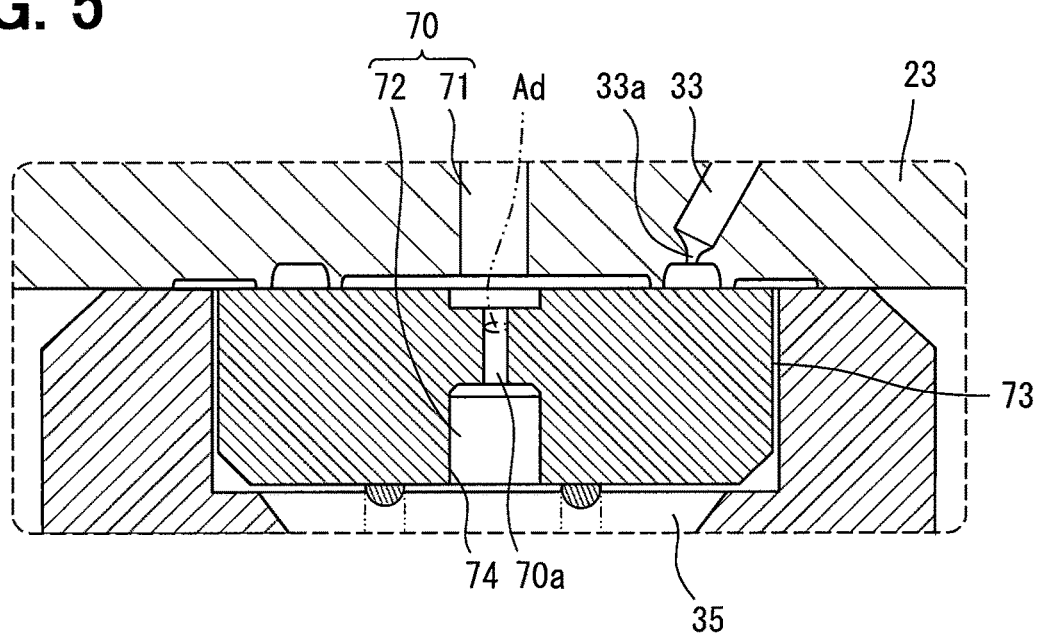
FIG. 5 is an enlarged view of a region V in FIG. 2.

The inflow communication passage 33 is a fuel passage formed in the orifice member 23. The inflow communication passage 33 is branched from the high pressure fuel passage 31, and connects the high pressure fuel passage 31 and the control chamber 35. As shown in FIG. 5, a main orifice 33a is formed in the inflow communication passage 33. The main orifice 33a limits the flow rate of fuel flowing into the control chamber 35 from the high pressure fuel passage 31.

The low pressure chamber 37 is formed in the injector body member 21. The low pressure chamber 37 is connected to the return pipe 8b. The low pressure chamber 37 is filled with low pressure fuel. The fuel in the control chamber 35 and the valve chamber 36 flows into the low pressure chamber.

The control communication passage 70 is a fuel passage which includes a main communication section 71 in the orifice member 23. When the control plate 73 is brought into contact with the orifice member 23, a connection communication section 72 is connected to the main communication section 71. A main orifice 70a is formed in the connection communication section 72. The control communication passage 70 fluidly connects the control chamber 35 and the valve chamber 36 with each other. When the fuel flows from the valve chamber 36 to the control chamber 35, the connection communication section 72 is fluidly disconnected from the main communication section 71. Meanwhile, when the fuel flows out from the control chamber 35 to the valve chamber 36, the connection communication section 72 is fluidly connected to the main communication section 71. As a result, the main orifice 70a in the control communication passage 70 limits the flow rate of the fuel flowing from the control chamber 35 to the valve chamber 36.

The low pressure communication passage 80 is a fuel passage formed in the valve body member 22. The valve chamber 36 and a pin housing hole 22a are fluidly connected to the low pressure chamber 37 through the low pressure communication passage 80, so that the fuel in the valve chamber 36 flows out into the low pressure chamber 37. The pin housing hole 22a is formed in a cylindrical hole shape in the valve body member 22 in an arrangement that is substantially coaxial with the valve chamber 36.

The low pressure communication passage 80 has a sub orifice 80a. The sub orifice 80a is connected to the pin housing hole 22a. An orifice inlet portion 81, which is one end of the sub orifice 80 a, is opened on a peripheral wall of the pin housing hole 22a. The sub orifice 80a limits the flow rate of fuel flowing out from the valve chamber 36 into the low pressure chamber 37.

The control chamber 35 is a columnar space defined by the orifice member 23, the needle cylinder 26, and the nozzle needle 50. The control chamber 35 is located on an opposite side of the nozzle hole 38 across the nozzle needle 50. The control chamber 35 accommodates the control plate 73 and the coil spring 78. Fuel is supplied to the control chamber 35 through two flow paths. One of the two flow paths is the inflow communication passage 33. The other of the two flow paths is the supply communication passage 32, the valve chamber 36, and the control communication passage 70. The control chamber 35 is filled with the fuel flowing through these flow paths.

The valve chamber 36 is a columnar space defined by the valve body member 22 and the orifice member 23. The valve chamber 36 is provided between the control chamber 35 and the low pressure chamber 37. The valve chamber 36 accommodates the control valve body 60 and a coil spring 68. The valve chamber 36 is filled with fuel supplied from the high pressure chamber 31a through the supply communication passage 32. The partition wall 36a defining the valve chamber 36 includes an inner peripheral wall surface 36c, a top wall surface 36d, and a bottom wall surface 36b.

The inner peripheral wall surface 36c is a cylindrical wall surface surrounding the control valve body 60. The top wall surface 36d has a connection opening 22c and an upper seat surface 27. The connection opening 22c is one end of the pin housing hole 22a, and is located at a center of the top wall surface 36d. The upper seat surface 27 surrounds the connection opening 22c in an annular shape. The upper seat surface 27 is formed in an inner tapered shape. The upper seat surface 27 faces a top surface of the control valve body 60.

The bottom wall surface 36b is formed on an upper end surface of the orifice member 23. The bottom wall surface 36b has a supply opening 32b and a lower seat surface 28. The supply opening 32b is one end of the supply communication passage 32, and is located at a center of the bottom wall surface 36b. The lower seat surface 28 surrounds the supply opening 32b in an annular shape. The lower seat surface 28 is formed at a position facing the upper seat surface 27 in the partition wall 36 a. The lower seat surface 28 faces a bottom surface of the control valve body 60.

The nozzle needle 50 is formed in a cylindrical shape with a metallic material. A tip end of the nozzle needle 50 is formed in a conical shape. The nozzle needle 50 is housed in the high pressure chamber 31a, and receives a force in a direction to open the injection port 38 from the high pressure fuel in the high pressure chamber 31a ("valve opening direction"). The nozzle needle 50 has a needle pressure receiving surface 51 formed therein.

The needle pressure receiving surface 51 is formed on an axial end surface of the nozzle needle 50, which faces the control chamber 35. The needle pressure receiving surface 51 receives a force in a direction to close the injection port 38 ("valve closing direction") from the high pressure fuel in the control chamber 35. In addition, the nozzle needle 50 is biased in a valve closing direction by a needle spring 53 formed in a cylindrical spiral shape.

When the fuel pressure in the control chamber 35 is decreased, the nozzle needle 50 is pushed up by the fuel in the high pressure chamber 31a to move in the valve opening direction. As a result, the high-pressure fuel in the high-pressure chamber 31a is injected toward the combustion chamber 2b through the injection port 38. Meanwhile, when the fuel pressure in the control chamber 35 is increased, the nozzle needle 50 is pushed down in the valve closing direction. As a result, the fuel injection is terminated. In this manner, the nozzle needle 50 is displaced relative to the valve body 20 along its axial direction due to a fuel pressure variation in the control chamber 35, whereby the injection port 38 is opened and closed.

A drive portion 40 drives the control valve body 60 by its expansion and contraction. The drive portion 40 has a piezoelectric actuator 41 and a drive transmission pin 42. The piezoelectric actuator 41 has a piezoelectric element laminate. The piezoelectric element laminate is a laminate of PZT (PbZrTiO₃) and a thin electrode layer. A drive voltage output from the control device 9 is input to the piezoelectric actuator 41. The piezoelectric actuator 41 expands when the drive voltage is applied thereto.

The drive transmission pin 42 is for transmitting an expansion of the piezoelectric actuator 41 to the control valve body 60. The drive transmission pin 42 is accommodated in the pin housing hole 22a. The distal end portion 42a of the drive transmission pin 42 abuts on a top surface of the control valve body 60. An outer diameter of the distal end portion 42a is made smaller than an inner diameter of the pin housing hole 22a. An annular gap 83 between the distal end portion 42a and the pin housing hole 22a functions as a passage for fuel flowing out from the valve chamber 36.

The drive portion 40 displaces the drive transmission pin 42 to protrude into the valve chamber 36 when the piezoelectric actuator 41 expands. When the piezoelectric actuator 41 contracts, the drive portion 40 pulls back the drive transmission pin 42 to the pin housing hole 22.

The control valve body 60 is formed in a columnar shape as a whole. The control valve body 60 is housed in the valve chamber 36 so as to be arranged coaxially with the valve chamber 36 and the valve body member 22. The control valve body 60 is urged toward the lower end face of the drive transmission pin 42 by the coil spring 68. The control valve body 60 is displaceable in the valve chamber 36 along its axial direction.

The control valve body 60 has a cylindrical portion 60a and a hemispherical portion 60b. The cylindrical portion 60a is formed in a columnar shape. The hemispherical portion 60b is formed in a partially spherical shape that is curved in a convex shape toward the connection opening 22c. A center of the hemispherical portion 60b is located on the central axis of the cylindrical portion 60a.

The control valve body 60 has an upper surface 61 and a lower surface 62. The upper surface 61 confronts to the upper seat surface 27. When the piezoelectric actuator 41 contracts, the upper surface 61 is pressed against the upper seat surface 27. The lower surface 62 confronts to the lower seat surface 28. When the piezoelectric actuator 41 expands, the lower surface 62 is pressed against the lower seat surface 28.

The control valve body 60 functions as a three-way valve that switches a connection between the valve chamber 36, the control chamber 35 and the low pressure chamber 37. Specifically, when the control valve body 60 is closed by seating the upper surface 61 on the upper seat surface 27, the valve chamber 36 is fluidly disconnected from the low pressure chamber 37. Meanwhile, when the control valve body 60 is opened by separating the upper surface 61 from the upper sheet surface 27, the valve chamber 36 is fluidly connected to the low pressure chamber 37 through the low pressure communication passage 80. When the control valve body 60 is opened, the lower surface 62 sits on the lower seat surface 28 and a gap restriction 90 is formed between the upper surface 61 and the upper seat surface 27.

The control plate 73 is formed in a flat disk shape as a whole. The control plate 73 is accommodated in the valve chamber 36 so as to be arranged coaxially with the control chamber 35 and the needle cylinder 26. The control plate 73 is displaceable in the control chamber 35 along its axial direction. The control plate 73 is urged toward the lower end surface of the orifice member 23 by the coil spring 78.

As shown in FIG. 5, the control plate 73 has a communication hole 74. The communicating hole 74 penetrates the control plate 73 in its axial direction. The communication hole 74 forms the connection communication section 72 of the control communication passage 70. The communication hole 74 has a main orifice 70a.

Referring to FIGS. 2 and 3, an operation of the fuel injection device 10 will be described.

When the piezoelectric actuator 41 is not energized, the control valve body 60 and the control plate 73 sit on the upper seat surface 27 and the orifice member 23, respectively. The fuel pressure in the control chamber 35 is substantially the same as the fuel pressure in the high pressure fuel passage 31. The nozzle needle 50 closes the injection port 38.

When the piezoelectric actuator 41 is energized, the upper surface 61 moves away from the upper seat surface 27 and the lower surface 62 sits on the lower seat surface 28. The high pressure chamber 31a and the valve chamber 36 are fluidly disconnected from each other. In addition, the communication between the high pressure fuel passage 31 and the control chamber 35 by the inflow communication passage 33 is also blocked by the control plate 73 which sits on the orifice member 23. The fuel injection device 10 does not inject the high pressure fuel.

The valve chamber 36 and the low pressure chamber 37 are connected with each other by the low pressure communication passage 80. Thus, the fuel in the control chamber 35 flows out into the low pressure chamber 37 through the control communication passage 70, the valve chamber 36, the pin housing hole 22a, and the low pressure communication passage 80. As a result, the fuel pressure in the control chamber 35 is decreased and the nozzle needle 50 moves in the valve-opening direction. The fuel injection is started.

When the piezoelectric actuator 41 is deenergized, the lower surface 62 moves away from the lower seat surface 28 and the upper surface 61 sits on the upper seat surface 27. The valve chamber 36 and the low pressure chamber 37 are fluidly disconnected from each other. The high pressure chamber 31a and the valve chamber 36 are fluidly connected with each other by the supply communication passage 32. The high-pressure fuel flows into the valve chamber 36 and the control chamber 35 through the supply communication passage 32, the control communication passage 70 and the inflow communication passage 33. As a result, the nozzle needle 50 moves in the valve-closing direction, and the fuel injection is terminated.

Figure 4:
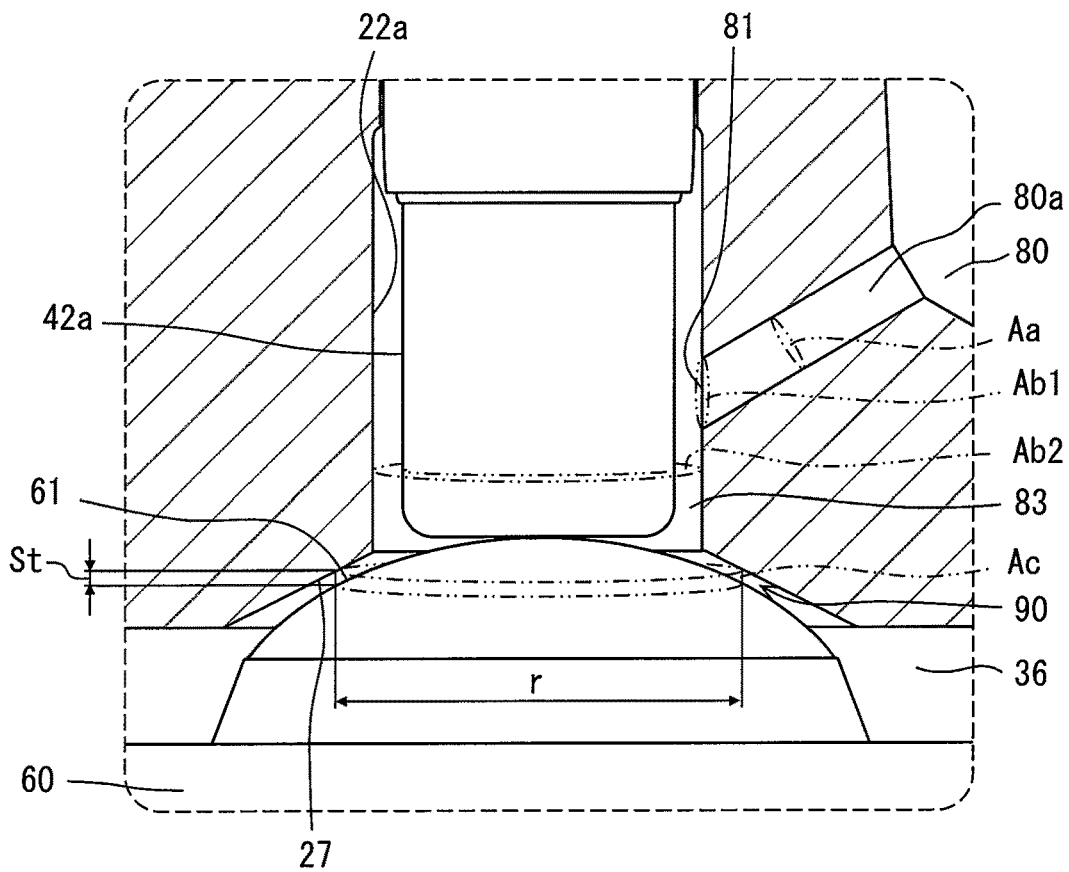
FIG. 4 is an enlarged view of a region IV in FIG. 3.
Figure 6:
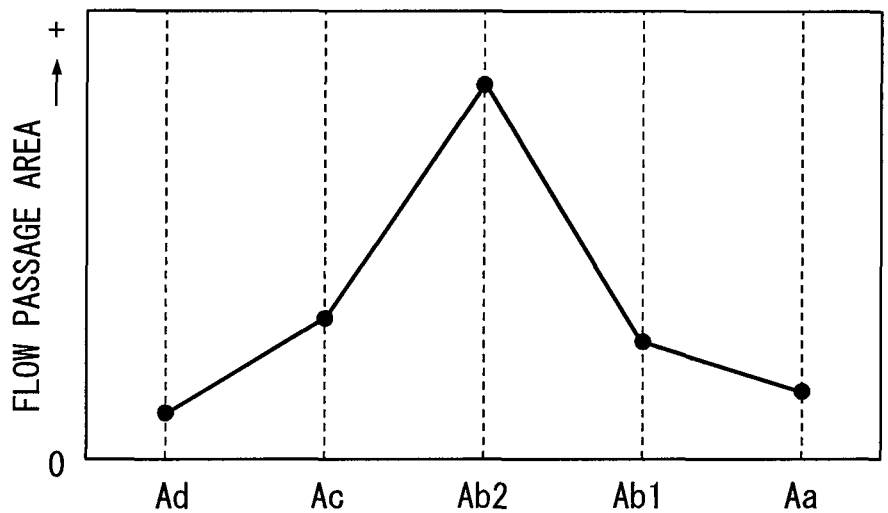
FIG. 6 is a chart diagram showing a flow passage area at restrictions of a passage from a control chamber to a low pressure chamber.

During the fuel injection period of the fuel injection device 10, the flow rate of fuel flowing from the control chamber 35 to the low pressure chamber 37 depends on the flow passage area of the fuel passage between the control chamber 35 and the low pressure chamber 37. Specifically, the flow passage area is restricted by the sub orifice 80a, the orifice inlet portion 81, the annular gap 83, the gap restriction 90 and the main orifice 70a. Referring to FIGS. 4 to 6, the flow passage area will be described in detail.

The flow passage area of the sub orifice 80a is denoted by "Aa" as shown in FIG. 4. The flow passage area "Aa" of the sub orifice 80a is smaller than a flow passage area "Ac" of the gap restriction 90.

A flow passage area "Ab1" of the orifice inlet portion 81 larger than the flow passage area "Aa" of the sub orifice 80a. The flow passage area "Ab1" of the orifice inlet portion 81 is defined to be 1.5 times or more the flow passage area "Aa" of the sub orifice 80a.

The flow passage area "Ab2" of the annular gap 83 is obtained by subtracting the cross sectional area of the distal end portion 42a from the cross sectional area of the pin housing hole 22a. The flow passage area "Ab2" of the annular gap 83 is larger than the flow passage areas "Aa", "Ab1" of the sub orifice 80a and the orifice inlet portion 81.

Specifically, the flow passage area "Ab2" of the annular gap 83 is about three times the flow passage area "Ab1" of the orifice inlet portion 81.

The flow passage area "Ac" of the gap restriction 90 is defined by a seat diameter "r" of the upper seat surface 27 and a maximum displacement "St" of the control valve body 60.

$$Ac = 2\pi \times r \times St$$

The maximum displacement "St" is a displacement amount for moving the control valve body 60 from the upper seat surface 27 to the lower seat surface 28. That is, when the control valve body 60 sits on the lower seat surface 28, a flow passage area between the upper surface 61 and the upper seat surface 27 corresponds to the flow passage area "Ac" of the gap restriction 90. The flow passage area "Ac" of the gap restriction 90 is larger than the flow passage area "Aa" of the sub orifice 80a and the flow passage area "Ab1" of the orifice inlet portion 81. Specifically, the flow passage area "Ac" of the gap restriction 90 is twice or more the flow passage area "Aa" of the sub orifice 80a.

The flow passage area of the main orifice 80a is denoted by "Ad" as shown in FIG. 5. The flow passage area "Ad" of the main orifice 70a is smaller than the flow passage area of the connection communication section 72 and the flow passage area of the main communication section 71. Furthermore, the flow passage area "Ad" of the main orifice 70a is smaller than the flow passage area "Aa" of the sub orifice 80a.

Specifically, the flow passage area "Aa" of the sub orifice 80a is 1.5 times or more the flow passage area "Ad" of the main orifice 70a. As a result, a ratio Ac/Aa (for example, 2.0) is larger than a ratio Aa/Ad (for example, 1.5).

In the above first embodiment, when the control valve body 60 is closed, the flow passage area "Aa" is smaller than the flow passage area "Ac". Therefore, the flow rate of fuel flowing from the control chamber 35 to the low pressure chamber 37 through the valve chamber 36 is mainly limited by the sub orifice 80a.

Figure 7A:
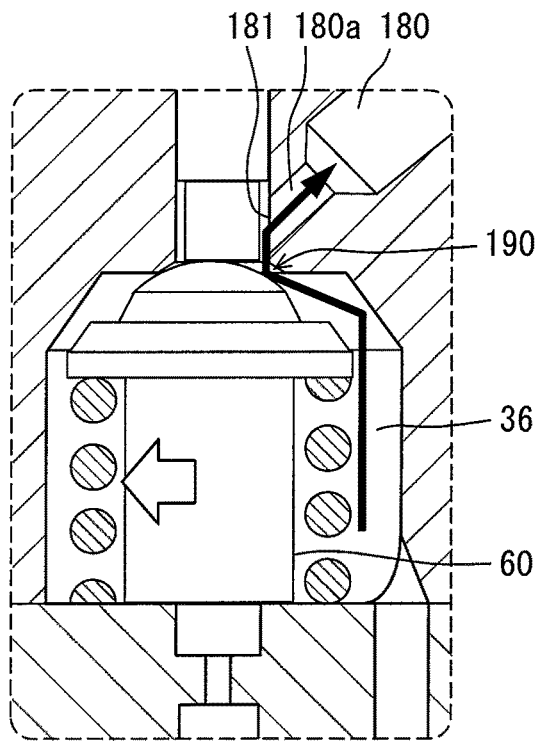
FIGS. 7A and 7B are charts for explaining a fuel flow rate variation in a comparative example.
Figure 7B:
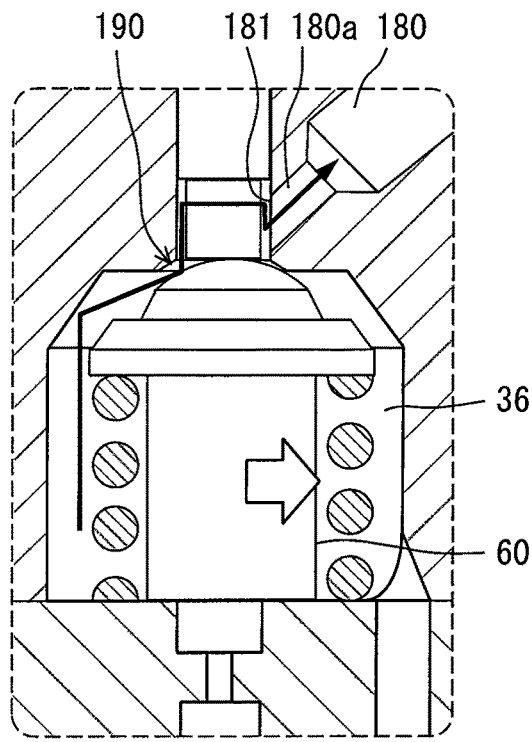

FIGS. 7A and 7B show comparative examples in which the flow passage area of the sub orifice 180a is larger than the flow passage area of the gap restriction 190. The fuel which has passed through the gap restriction 190 flows into the low pressure communication passage 180 without being limited by the sub orifice 180a. Therefore, the fuel pressure between the gap restriction 190 and the sub orifice 180a tends to be decreased more than the fuel pressure in the valve chamber 36. In a case that the control valve body 60 is radially displaced, the flow rate of fuel flowing through the gap restriction 190 is largely varied.

Specifically, as shown in FIG. 7A, when the control valve body 60 is displaced in a direction away from the orifice inlet portion 181, the fuel flow rate increases as compared with a case where the control valve body 60 is in a normal position. Meanwhile, as shown in FIG. 7B, when the control valve body 60 is displaced in a direction close to the orifice inlet portion 181, the fuel flow rate increases as compared with a case where the control valve body 60 is in a normal position.

Figure 8A:
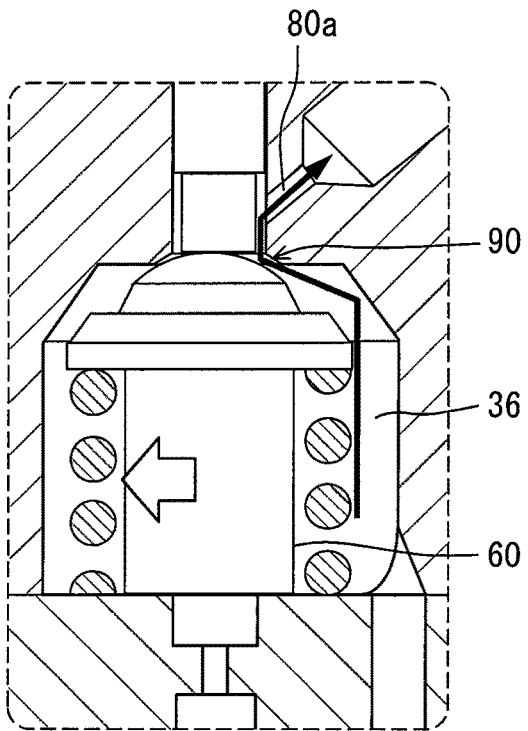
FIGS. 8A and 8B are charts for explaining an advantage according to the first embodiment.
Figure 8B:
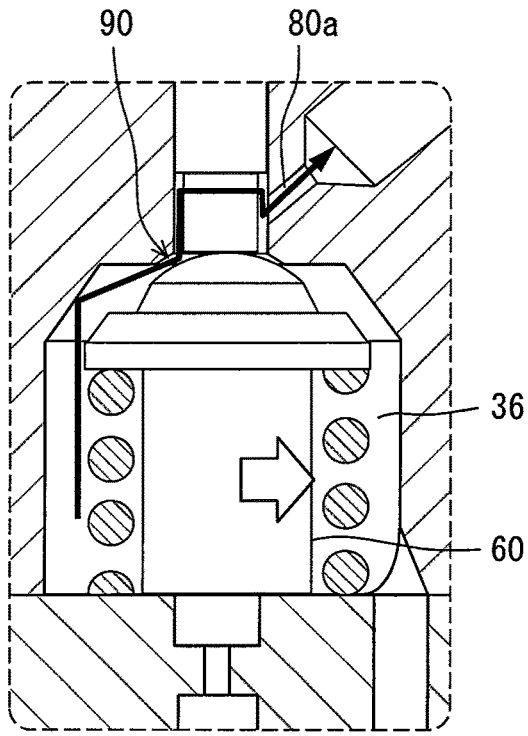

According to the first embodiment, as shown in FIGS. 4, 8A and 8B, the flow passage area "Aa" of the sub orifice 80a is smaller than the flow passage area "Ac" of the gap restriction 90. Therefore, the fuel which has passed through the gap restriction 90 is restricted from flowing into the low pressure chamber 37 by the sub orifice 80a. The fuel pressure between the gap restriction 90 and the sub orifice 180a tends to be decreased more than the fuel pressure in the valve chamber 36.

Even when the control valve body 60 is radially displaced as shown in FIGS. 8A and 8B, the flow rate flowing through the gap restriction 90 is hardly varied. Therefore, it can be restricted that the fuel injection rate injected through the injection port 38 is fluctuated due to a variation in opening position of the nozzle 50.

Furthermore, according to the first embodiment, the flow passage area "Ac" of the gap restriction 90 is larger enough than the flow passage area "Aa" of the sub orifice 80a. Therefore, the flow rate of fuel flowing out from the control chamber 35 into the low pressure chamber 37 is dominantly limited by the sub orifice 80a. The opening position of the nozzle needle 50 is hardly varied.

In the first embodiment, the flow rate of fuel flowing out from the control chamber 35 to the valve chamber 36 is limited by the main orifice 70a. The fluctuation in flow rate of fuel flowing out from the valve chamber 36 to the low pressure chamber 37 less affects to the depressurization in the control chamber 35. The opening position of the nozzle needle 50 is hardly varied.

Figure 9:
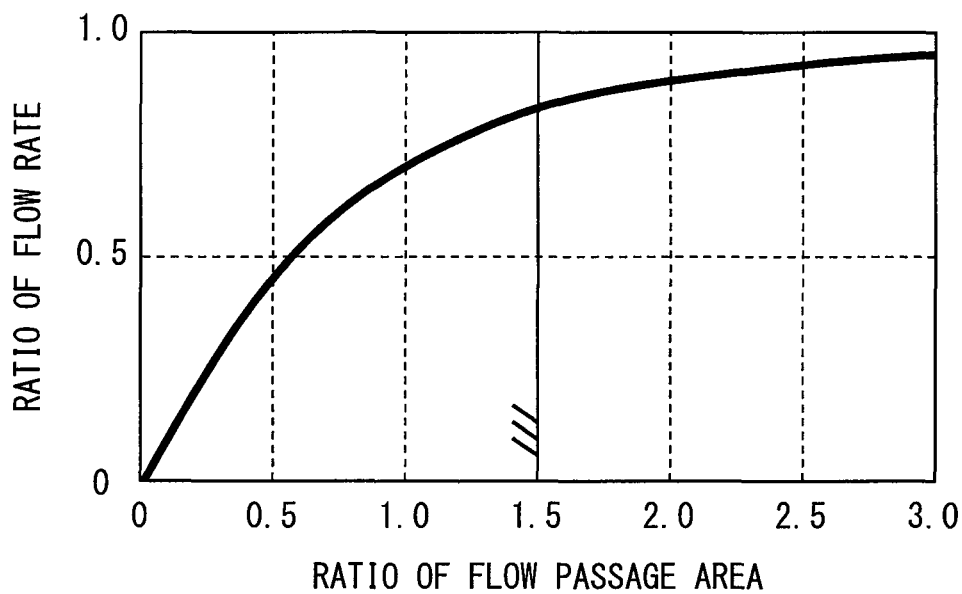
FIG. 9 is a chart showing a relationship between a ratio of flow passage area and a ratio of flow rate.

Furthermore, according to the first embodiment, the flow passage area "Ad" of the main orifice 70a is smaller enough than the flow passage area "Aa" of the sub orifice 80a. According to the above ratio of the flow passage area, the flow rate of fuel flowing through the main orifice 70a receives less influence from the sub orifice 80a, as shown in FIG. 9. The flow rate of fuel flowing out from the control chamber 35 into the valve chamber 36 is less fluctuated.

The shape of the gap restriction 90 may be varied. For example, when the control valve body 60 is radially displaced along the bottom surface 36b, the shape of the gap restriction 90 is varied, so that the flow passage area "Ac" is also varied.

According to the first embodiment, the ratio Ac/Aa which may be varied is larger than the ratio Aa/Ad. Therefore, even when the flow passage area "Ac" of the gap restriction 90 is varied, the variation in flow rate of fuel flowing through the gap restriction 90 and the sub orifice 80a does not effect on an entire fuel flow from the control chamber 35 to the low pressure chamber 37. The opening position of the nozzle needle 50 is hardly varied.

When the gap restriction 90 is enlarged, the load of the driving portion 40 for driving the control valve body 60 is increased. Particularly, in the fuel injection device 10 which injects the high pressure fuel, the load of the driving portion 40 becomes large. According to the first embodiment, the ratio Aa/Ad is defined smaller than the ratio Ac/Aa, and a difference between the flow passage areas "Aa" and "Ad" is restricted. Thus, the enlargement of the flow passage area "Ac" of the gap restriction 90 is limited. According to the above, it can be avoided that the load of the driving portion 40 is increased.

When the flow passage areas "Aa" and "Ad" are ensured, the flow rate of fuel flowing out from the control chamber 35 to the low pressure chamber 37 is increased. As a result, the responsiveness of the nozzle needle 50 with respect to the control valve body 60 is further improved.

When the control valve body 60 is opened, the control valve body 60 sits on the lower seat surface 28. Therefore, the position of the control valve body 60 becomes stable in a driving direction of the driving portion 40. The displacement of the control valve body 60 in the axial direction does not occur. As a result, the fluctuation in the flow passage area "Ac" of the gap restriction 90 is decreased, and the displacement of the nozzle needle 50 becomes stable.

In the first embodiment, the valve body 20 corresponds to a "body", the upper seat surface 27 corresponds to an "outflow seat surface", the lower seat surface 28 corresponds to a "confront seat surface", the low pressure chamber 37 corresponds to a "low pressure side", and the nozzle needle 50 corresponds to a "valve member". The upper seat surface 61 corresponds to a "seat surface", the control communication passage 70 corresponds to a "communication passage", the main orifice 70a corresponds to a "communication orifice", the low pressure communication passage 80 corresponds to an "outflow passage", and the sub orifice 80a corresponds to an "outflow orifice".

Second Embodiment

Figure 10:
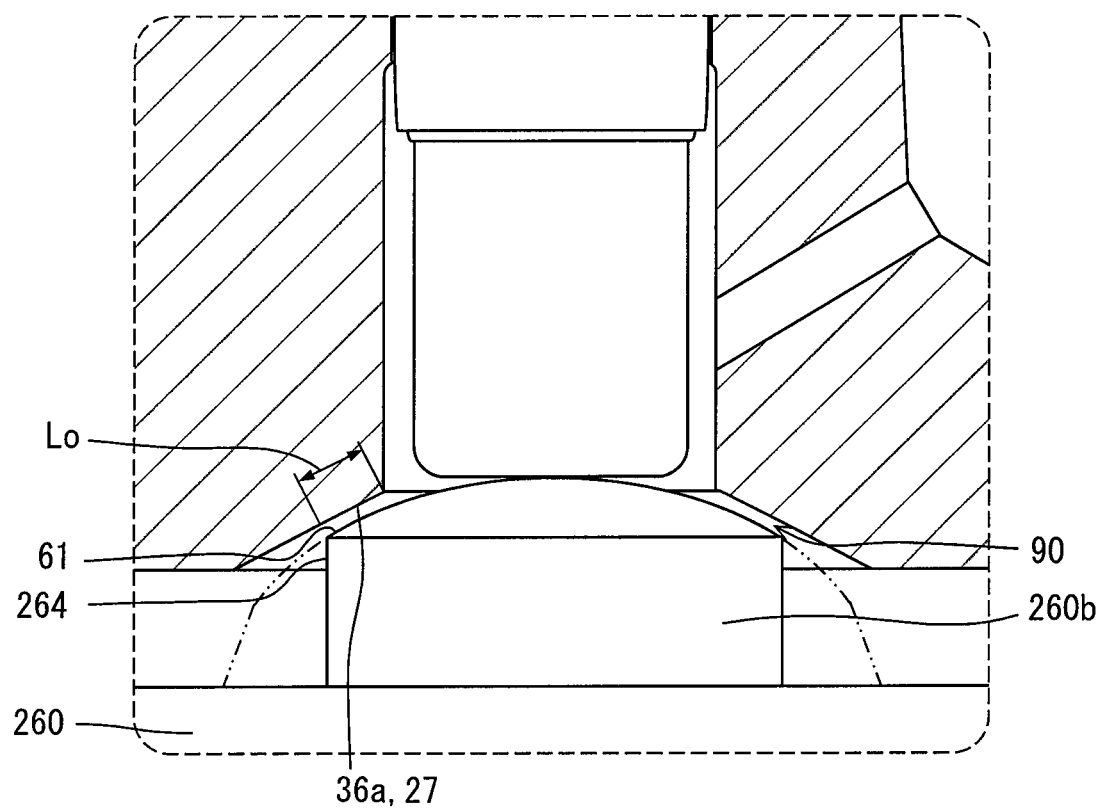
FIG. 10 is a longitudinal sectional view of a fuel injection device according to a second embodiment.

A second embodiment shown in FIG. 10 is a modification of the first embodiment. A control valve body 260 has a recess portion 264. The recess portion 264 is formed around the upper surface 61. The recess portion 264 cuts out the hemispherical portion 260b, and reduces an outer diameter of the hemispherical portion 260b, as shown by two-dot chain line. The recess portion 264 is formed on the upper surface 61. A restricting length "Lo" of the gap restriction 90 is shorter than a case where no recess portion is provided.

According to the second embodiment, the same advantages can be achieved as the first embodiment. It is restricted than the flow rate of fuel injected from the injection port 38 varies. The restricting length "Lo" of the gap restriction 90 is made short by the recess portion 264. The fuel flow rate is less changed even if the shape of the gap restriction 90 is varied. Even when the control valve body 260 is radially displaced, the fuel flow rate is less changed.

Other Embodiments

Although the embodiments of the present disclosure have been described above, the present disclosure is not construed as being limited to the above-described embodiments, but may be applied to various embodiments and combinations without departing from the gist of the present disclosure.

In the above embodiment, it is defined that Ac/Aa>Aa/Ad. However, as long as it is satisfied that Ac>Aa, each flow passage areas "Aa", "Ac", "Ad" may be appropriately changed.

In the above embodiments, when the control valve body sits on the lower seat surface, the flow passage area of the gap restriction is larger than the flow passage area of the sub orifice. However, the control valve body may not sit on the lower seat surface. In a case that the control valve body is not normally in contact with the lower seat surface, the flow passage area of the sub orifice may be set smaller than the flow passage area of the gap restriction when the control valve body is positioned at a middle position.

In the above embodiments, the main orifice has a smaller diameter than the sub orifice. However, the main orifice may have the same diameter as the sub orifice. Alternatively, the main orifice may have larger diameter than the sub orifice.

In the above embodiments, the control communication passage 70 and the low pressure communication passage 80 are arranged on the same side with respect to the center axis of the control valve body 60. However, the control communication passage 70 and the low pressure communication passage 80 may be arranged on an opposite side with respect to the center axis of the control body 60.

In the above-described embodiment, a piezoelectric actuator is employed as the driving portion. However, another actuator can be employed as the driving portion.

The fuel injection device may inject fuel other than light oil, for example liquefied gas such as dimethyl ether.

What is claimed is:

1. A fuel injection device for injecting a fuel from an injection port comprising:
   a body defining the injection port, a control chamber filled with the fuel, a valve chamber communicating with the control chamber, and an outflow passage for discharging the fuel in the valve chamber into a pressure chamber;
   a control plate accommodated in the control chamber;
   a valve member which is displaced by a variation in a fuel pressure in the control chamber to open/close the injection port;
   a control valve body accommodated in the valve chamber in such a manner as to be capable of disconnecting the valve chamber and the pressure chamber by sitting on an outflow seat surface formed on a partition wall which defines the valve chamber; and
   a driving portion driving the control valve body in such a manner that the control valve body sits on the outflow seat surface or moves away from the outflow seat surface, wherein
   the control valve body defines a gap restriction on the outflow seat surface when the valve chamber communicates with the pressure chamber through the outflow passage;
   the outflow passage has an outflow orifice which limits a flow rate of the fuel flowing out from the valve chamber into the pressure chamber,
   the outflow orifice has a flow passage area which is smaller than a flow passage area of the gap restriction,
   the body defines a communication passage which fluidly connects the control chamber and the valve chamber,
   the communication passage has a communication orifice of which a flow passage area is smaller than the flow passage area of the outflow orifice, and
   the communication orifice is defined within the control plate.

2. The fuel injection device according to claim 1, wherein the flow passage area of the gap restriction is twice or more of the flow passage area of the outflow orifice.

3. The fuel injection device according to claim 1, wherein the flow passage area of the outflow orifice is 1.5 times or more the flow passage area of the communication orifice.

4. The fuel injection device according to claim 1, wherein a flow passage area ratio between the outflow orifice and the gap restriction is larger than a flow passage area ratio between the communicate orifice and the outflow orifice.

5. The fuel injection device according to claim 1, wherein the control valve body has an annular seat surface which sits on the outflow seat surface and a recess portion.

6. The fuel injection device according to claim 1, wherein the partition wall has a confront seat surface on which the control valve body sits, and
the flow passage area of the gap restriction is a flow passage area defined between the control valve body and the outflow seat surface.

7. The fuel injection device according to claim 1, wherein:
the control plate is displaceable in the control chamber along an axial direction of the control chamber.

8. The fuel injection device according to claim 1, wherein the body includes a fuel passage; and
the fuel injection device further comprises an inflow communication passage that fluidly connects the fuel passage and the control chamber.

* * * * *